F. W. PEEK, Jr.
DISTRIBUTION SYSTEM.
APPLICATION FILED DEC. 14, 1908.
919,633.
Patented Apr. 27, 1909.
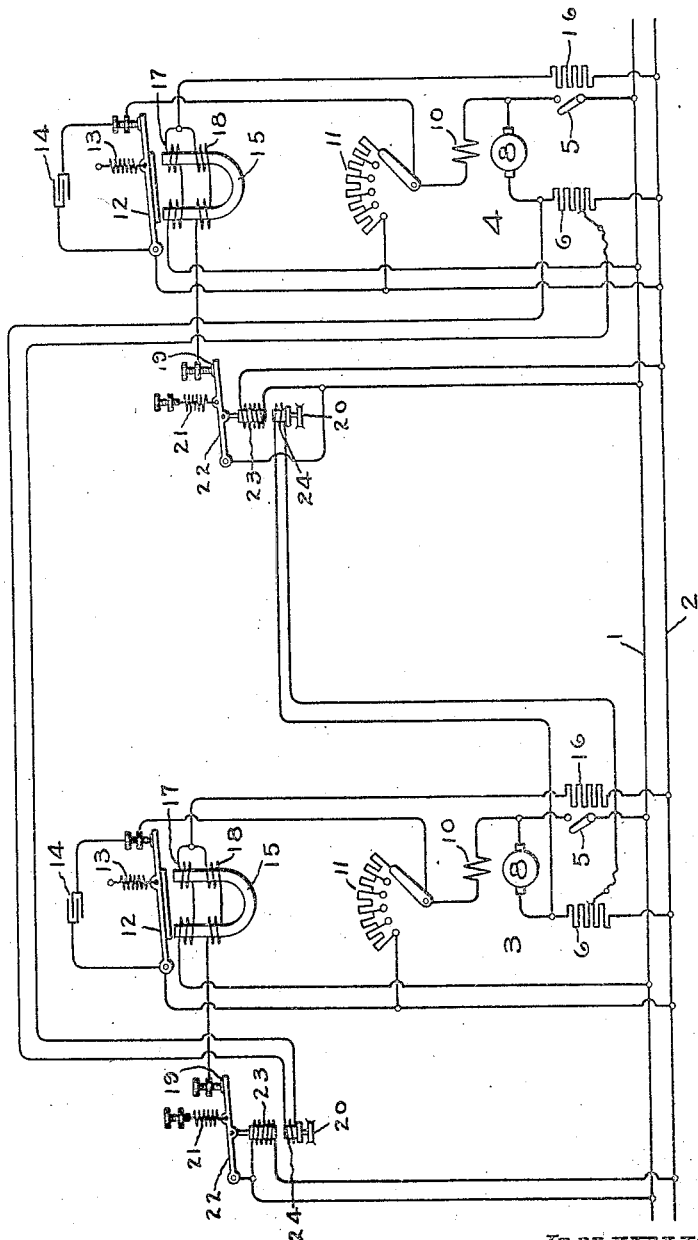
WITNESSES:
Lester H. Fulmer
J. Ellis Glen
INVENTOR
FRANK W. PEEK, JR.
BY
ATTY

UNITED STATES PATENT OFFICE.

FRANK W. PEEK, JR., OF SCHENECTADY, NEW YORK, ASSIGNOR TO GENERAL ELECTRIC COMPANY, A CORPORATION OF NEW YORK.

DISTRIBUTION SYSTEM.

No. 919,633.

Specification of Letters Patent.     Patented April 27, 1909.

Application filed December 14, 1908. Serial No. 467,493.

*To all whom it may concern:*

Be it known that I, FRANK W. PEEK, Jr., a citizen of the United States, residing at Schenectady, in the county of Schenectady and State of New York, have invented certain new and useful Improvements in Distribution Systems, of which the following is a specification.

My invention has reference to means for distributing the load on two self-excited, direct-current generators connected in parallel, which are equipped with regulators of the Tirrill type. This type of regulator operates to maintain constant potential with constant load, and to increase the potential with a rising load, so as to compensate for the increased drop on the transmission line when the generator and load are situated at distant points. In order to accomplish this the main regulating magnet is provided with two differential windings, the current in one of which varies with the voltage on the line, and the current in the other with the load. If two generators, equipped with Tirrill regulators, are to be operated in parallel and if a predetermined division of load is to be maintained the electrical characteristics of the generators and the speed and sensitiveness of the regulators must be the same, for with the variation of load both regulators must simultaneously vary the voltage of each machine in a predetermined ratio. But it is not possible to obtain this exact identity in the generators and regulators, and the result is that a predetermined division of load can not be maintained when using the regulators in the ordinary manner.

It is the aim of my invention to so modify the arrangement of the regulators that they will automatically maintain this predetermined division of load. This is done by making the variations of current in the compensating current coil of the regulator of each machine dependent upon the variations of the load on the other machine. In other words, when one machine tends to take more than its share of the load, the current supplied to the compensating current coil of the regulator of the other machine will be increased, tending to raise the voltage on this second machine and thereby restore the division of load.

The accompanying drawing is a diagram of circuits, showing one form which my invention may assume.

Like numerals of reference indicate like parts.

The load circuit 1, 2 is fed by the two separately-excited generators 3, 4, operating in parallel. Either of these generators may be disconnected from the load circuit by switches 5. An adjustable non-inductive resistance 6 is located in the lead of each of the armatures 8 of the two generators. The purpose of this resistance will be explained presently. Each generator is provided with a shunt field 10 in series with a rheostat 11. Each rheostat 11 is shunted by a switch 12 normally held closed by a spring 13. A condenser 14 is placed across each set of switch contacts in order to suppress sparking. The switches 12 are opened and closed, cutting the resistance in the field of the generator in and out according to the usual well-known manner of operation of voltage regulators of the Tirrill type. The movement of each switch lever 12 is controlled by a relay magnet 15, each provided with differential windings connected in series with a resistance 16. One of these differential windings 17 of each magnet 15 is connected permanently across the line, while the opposing winding 18 is connected across the line through contacts 19, which are opened and closed by the action of a magnet 20, which we may term the "main control magnet". These contacts are held normally closed each by a spring 21 connected to a switch lever 22. The switch levers 22 are each connected to the core of the conjugated main control magnet, as is clearly shown. The main control magnets are provided each with the usual potential winding 23 connected across the line, and the usual current coils 24, wound to generate an opposing magnetomotive force. The coil 24 in the regulator for generator 3 is connected across the resistance 6 in the armature lead of generator 4, and the coil 24 in the regulator for generator 4 is connected across the resistance 6 of the generator 3. The opposing windings in the main control magnet have been shown separately for the sake of clearness; but it will be readily understood that they may be superimposed upon one another.

The operation of the regulator in maintaining the proper division of load is as follows: When the load on the machines is to be equally divided the resistances 6, 6 are made equal. The voltage regulators will operate in the usual manner, cutting the field resistances 11 in and out in order to maintain constant potential. Suppose that with an increase of load generator 4 tends to furnish more than its share of the current. In that case the voltage drop across the resistance 6 of this generator will increase and, hence, more current will flow through the coil 24 of the regulator for generator 3. As the coil 24 opposes the coil 23 the contacts 19 will remain closed for a somewhat longer time. As coils 17 and 18 in the relay magnet 15 for generator 3 oppose one another, and since under the conditions just described its winding 18 is energized as long as the contact at 19 is closed, the switch 12 will remain closed for a somewhat longer time, and as this switch short circuits the resister in the field of the generator 3 the voltage of the generator 3 will tend to rise somewhat and the original division of load will be maintained.

In case one machine is intended to furnish more than its share of the load, the resistances 6, 6 are adjusted in accordance with the division of load which is intended, a greater resistance in the armature lead of either generator will tend to increase the proportion of the total load carried by the other generator.

Having now fully described my invention, what I claim as new and desire to secure by Letters Patent, is:

1. The combination of two self-excited direct-current generators connected in parallel, a voltage regulator for each machine containing a differentially-wound magnet, one winding of which varies with the voltage of its own generator and the other with the load on the other generator.

2. Means for maintaining a predetermined division of load between two self-excited generators connected in parallel, which comprises a voltage regulator for each machine responsive to the voltage of its own machine and the load on the other machine.

3. The combination of two direct-current generators connected in parallel, a resistance in the armature lead of each machine, a regulator for each machine comprising a differentially-wound main control magnet, one winding of which is connected across the line served by both machines and the other across the resistance in the armature lead of the other machine.

In witness whereof, I have hereunto set my hand this 11th day of December, 1908.

FRANK W. PEEK, JR.

Witnesses:
BENJAMIN B. HULL,
HELEN ORFORD.